2 Sheets—Sheet 1.

W. B. & H. C. ATKINSON.
Shipping-Case.

No. 213,859.      Patented April 1, 1879.

Witnesses:
F. Walter Fowler,
Moses Foskey.

Inventors:
W. B. Atkinson
H. C. Atkinson
per S. S. Kirk
Attorney

W. B. & H. C. ATKINSON.
Shipping-Case.
No. 213,859. Patented April 1, 1879.
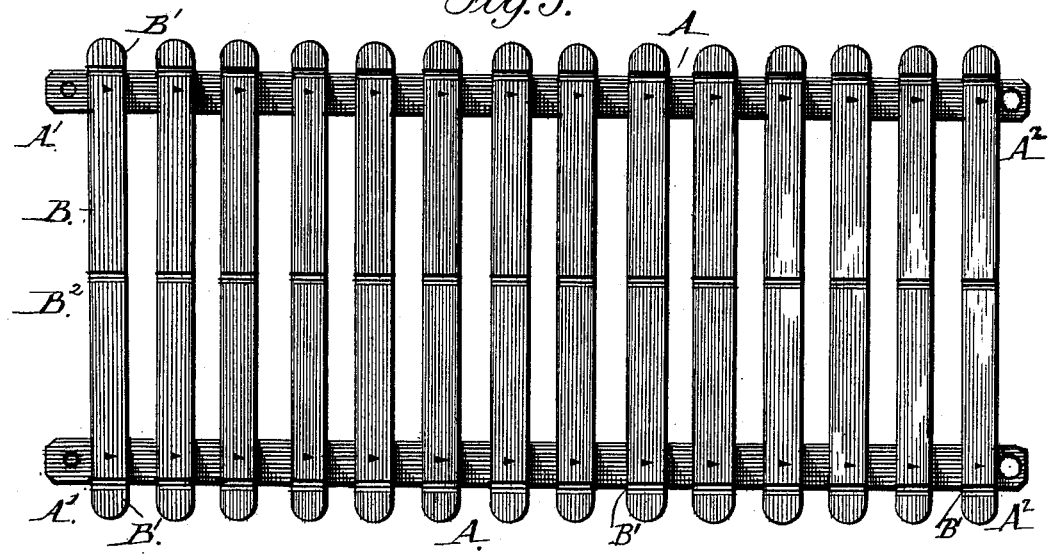
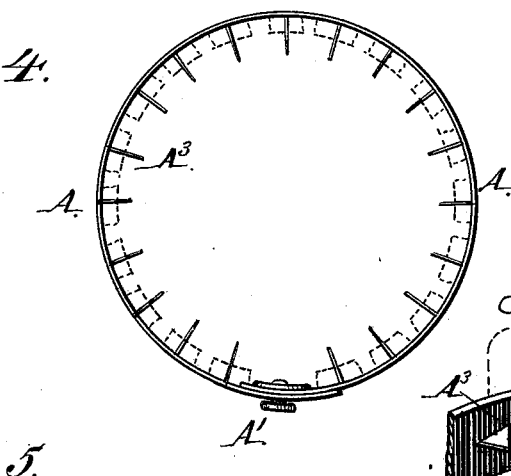
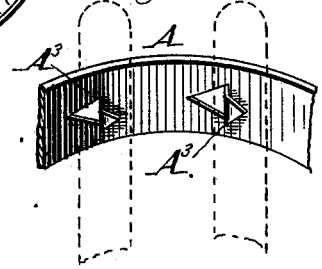
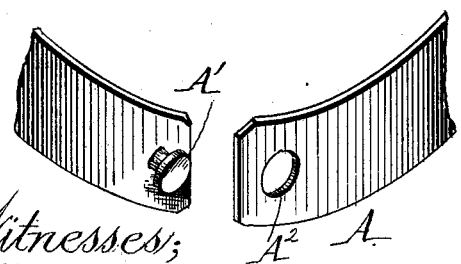

UNITED STATES PATENT OFFICE.

WILLIAM B. ATKINSON AND HENRY C. ATKINSON, OF FRANKLIN, KY.

IMPROVEMENT IN SHIPPING-CASES.

Specification forming part of Letters Patent No. 213,859, dated April 1, 1879; application filed February 5, 1879.

*To all whom it may concern:*

Be it known that we, WILLIAM BROWNLOW ATKINSON and HENRY CATE ATKINSON, of Franklin, in the county of Simpson, and in the State of Kentucky, have invented certain new and useful Improvements in Shipping Cases or Jackets; and do hereby declare that the following is a full, clear, and exact description thereof, reference being had to the accompanying drawings, and to the letters of reference marked thereon, making a part of this specification.

Our invention relates to improvements in shipping-cases for the transportation of fruits or vegetables or similar substances; and the object we have in view is twofold—first, to provide a shipping-case with sufficient air-spaces all around its circumference to insure perfect ventilation through the fruit or vegetables contained in the shipping-case, by which arrangement fruit and vegetables transported in such a ventilated case can be transported long distances without signs of decay; and, secondly, in so constructing a ventilated shipping-case that it may be taken apart on arriving at its destination and packed in a small compass and returned to the producer, thereby saving in freight and dispensing with a new set of shipping-cases for each lot of fruit. This we accomplish by attaching the staves to metallic hoops in such a manner that an open space is left between every stave. The ends of the hoops are locked together by means of a button or pin in one end of the hoop projecting through a hole in the other end of the hoop, or in a similar or equivalent manner.

We further accomplish this end by providing heads for each end of the case, that may be secured into grooves in the ends of the staves by dovetailed keys without the use of tacks, and that, therefore, may be removed by removing the keys without injury to the case.

By removing the heads, as indicated, the ends of the hoops may be detached or unbuttoned, so that the hoops and staves secured thereto may be laid out flat, as shown in Fig. 3 of the drawings, the heads may be laid flat on this, and a large number of the cases thus disposed may be shipped in the space occupied by a single case when set up for use.

Figure 1:
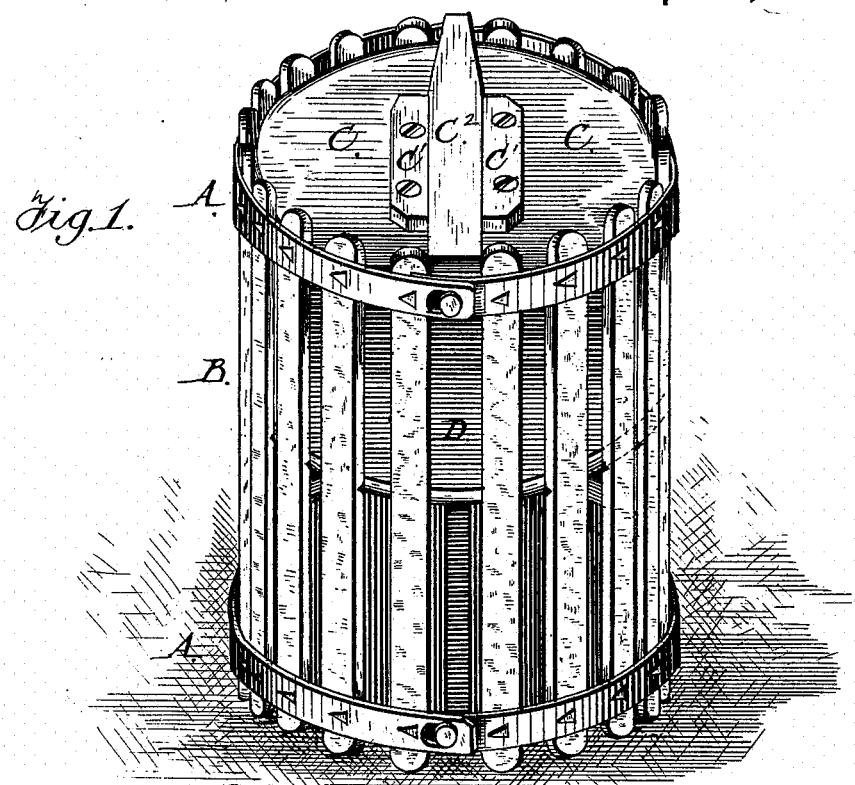
Figure 2:
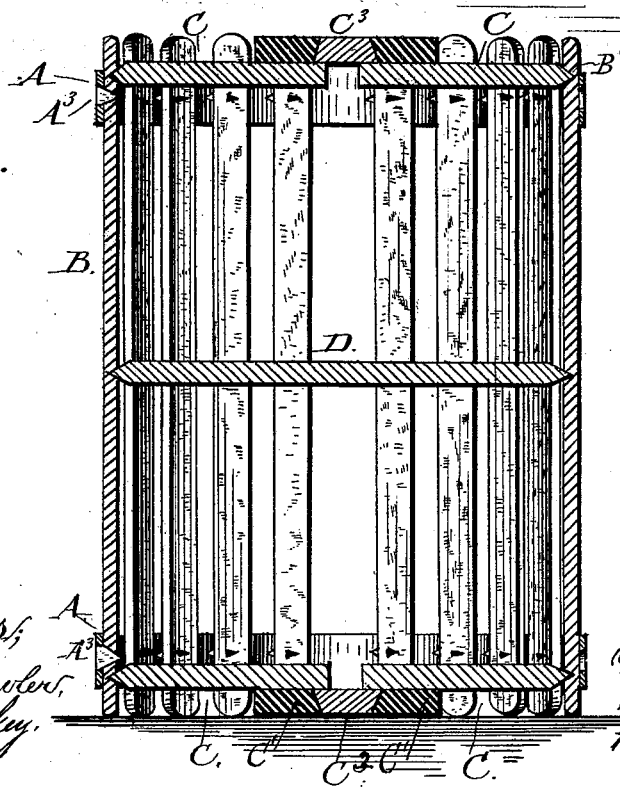

In the drawings, Figure 1 is a perspective view of my shipping-case set up, showing all the parts in relative position. Fig. 2 is a vertical section of the same. Fig. 3 shows the hoops and the staves secured thereto laid out flat for shipping. Fig. 4 is a plan view of a hoop, showing the ends buttoned or attached to each other, and also showing the triangular-shaped points stamped out of the hoop, and bent at right angles to the same, and passing through the staves, (shown in dotted lines,) ready to be clinched upon the same. Fig. 5 is a perspective view of the two ends of the hoop, showing the button on one and the corresponding opening on the other. Fig. 6 is a detached perspective view, showing the triangular points clinched upon the staves. Fig. 7 is a sectional view of the same.

Similar letters of reference indicate corresponding parts.

A A are the hoops, which are preferably made of metal, and of any length desired, according to the size of the case wanted. On one end of the hoop is secured a pin or button, $A^1$, which may be buttoned into the corresponding opening $A^2$ in the other end of the hoop. When the hoop is brought into a curved or circular position, the spring of the hoop in its tendency to assume the straightened position will prevent the ends from becoming unbuttoned, and this is further secured by the outward pressure of the heads of the case.

B B are the staves, which may be made of any suitable material, wood being preferred, and may be of any desired width or thickness, and of a length and number according to the size of the case wanted. These staves B are firmly secured to the hoops A by means of the triangular points $A^3$ driven through said staves, as shown in Fig. 4, and clinched on the inside of the staves, as shown in the other figures, especially in Figs. 6 and 7.

This mode of fastening the staves to the hoops has great advantages over the ordinary plan of loose rivets or tacks, as it is a firmer fastening, and at the same time allows much greater elasticity of the hoop. It is cheaper than the usual devices for fastening staves, it being stamped from the hoop itself, and requiring less labor or expense in securing the staves to the hoop by its means.

In the inside of the ends of the staves grooves

B¹ are cut; also, grooves B² are cut in the center of the stave. Into grooves B¹ are fitted two head-pieces, C C, which, when adjusted to their places, leave a small space between them. Upon the straight sides of head-pieces C C are firmly secured strips C¹ C¹, which are beveled on their under sides, and which, when adjusted together, form a dovetailed groove, into which the dovetailed key C² is driven from one side of the case, thus forcing the outer edges of the pieces C C into the grooves B¹, and thereby securing a firm heading in the case, and making the whole case firm and compact without the use of tacks or other means that would injure the case.

Center-board or partition D may or may not be used, as desired, and is preferably formed of one piece, though it may be formed of several pieces by properly securing the same together. When center-board D is used the "stave-work" A B is first brought into the cylindrical form, and the ends of the hoops A buttoned; then the center-board D is pressed downward through the same and into grooves B², where the inward-springing staves will keep it in place. The case by this means alone will be firmly held in shape without the head-pieces C C, and in this shape may be used as a "peck-measure," or any other measure desired, according to the size of the case.

It is obvious that the whole case may be readily taken down and laid out flat or packed for reshipping by removing the key C² and taking out pieces C and D, and unbuttoning the hoops A.

Having thus described our invention, what we claim as new, and desire to secure by Letters Patent, is—

1. Hoop A, having points A³ driven through staves B, and clinched on the inner side thereof, and also having button A¹ and opening A², substantially as and for the purpose set forth.

2. Hoop A, having points A³ driven through staves B, and clinched on the inner side of the same, and also having button A¹ and opening A², in combination with head-pieces C C¹ C², and center-board D, substantially as and for the purpose set forth.

In testimony that we claim the foregoing we have hereunto set our hands this 28th day of January, 1879.

WILLIAM BROWNLOW ATKINSON.
HENRY CATE ATKINSON.

Witnesses:
W. LEE WILKINSON,
P. J. BOGAN.